United States Patent
Albaum et al.

(10) Patent No.: US 6,479,214 B1
(45) Date of Patent: Nov. 12, 2002

(54) HIGH DENSITY OPTICAL STORAGE AND RETRIEVAL USING THE ELECTROMAGNETIC ABSORPTION SPECTRUM TO REPRESENT MULTIPLE BIT INFORMATION

(76) Inventors: Shelly Albaum, 2250 104th St., Shakopee, MN (US) 55379; David Spitzer, 929 Linwood Ave., Saint Paul, MN (US) 55105

(*) Notice: Subject to any disclaimer, the term of this patent is extended or adjusted under 35 U.S.C. 154(b) by 1490 days.

(21) Appl. No.: 08/636,712

(22) Filed: Apr. 23, 1996

Related U.S. Application Data

(63) Continuation of application No. 08/381,706, filed on Jan. 31, 1995, now abandoned.

(51) Int. Cl.[7] .................................................. G11B 7/24
(52) U.S. Cl. ........................ 430/270.15; 430/270.11; 430/945; 428/913; 428/914; 369/283; 369/284; 369/286; 369/288; 346/135.1
(58) Field of Search ........................... 436/945, 270.11, 436/270.15; 428/913, 914, 64.8, 64.4; 369/283, 284, 286, 288; 346/135.1

(56) References Cited

U.S. PATENT DOCUMENTS

| | | | | |
|---|---|---|---|---|
| 4,090,031 A | * | 5/1978 | Russell | 369/284 |
| 4,314,260 A | * | 2/1982 | Drexler | 346/135.1 |
| 4,412,231 A | * | 10/1983 | Namba et al. | 430/945 |
| 4,737,427 A | * | 4/1988 | Miyazaki et al. | 430/945 |
| 5,353,247 A | * | 10/1994 | Faris | 369/100 |

OTHER PUBLICATIONS

T.H. James "Theory of the Photographic Process" (© 1977) pp. 336.*

K. Keller "Science and Technology of Photography" (© 1993) pp. 103–123, 134–136 & 205.*

Taking Optical Storage to Tera–Byte Capacities, Electronic Materials Tech. News, 1995 WL 8381925.

* cited by examiner

*Primary Examiner*—Martin Angebrannadt

(57) ABSTRACT

An apparatus for retrieving information stored on an optical disk as colored dots, using an array of laser diodes emitting multiple wavelengths. Colored dots store more information than pits and spaces on optical disks because each colored dot represents a multiple-bit code of information rather than a single bit. The optical disk reader directs multiple wavelength diode laser beams to the disk surface. The reflected beams are then separated using an array of dichroic filters, and sent to light sensors. The light sensors identify the intensity of each of the reflected frequencies and determine the wavelength combination being reflected from the optical disk, which corresponds to a multiple-bit code.

7 Claims, 2 Drawing Sheets

HIGH DENSITY OPTICAL STORAGE AND RETRIEVAL USING THE ELECTROMAGNETIC ABSORPTION SPECTRUM TO REPRESENT MULTIPLE BIT INFORMATION

This is a continuation of application Ser. No. 08/381,706, filed Jan. 31, 1995, now abandoned.

FIELD OF INVENTION

This invention relates generally to optical data storage and retrieval where multiple bit information is stored at each physical location, and more particularly to high density optical storage in which the absorption spectrum of a chemical composition at a position on an optical disk conforms to a desired value in multiple bit code for that position.

BACKGROUND OF THE INVENTION

Optical recording technology currently uses a disk to store large amounts of binary-coded information in a small space by using pits and intervening spaces, or lands. Typically, a highly focused diode laser beam passes over a reflective surface. The reflected light is directed to a sensor that detects modulations that result when a vertical transition from a land to a pit, or vice versa, diffracts rather than reflects the light beam. The result is a binary code with the transitions equalling one's and the variable spaces between them equalling some number of zero's.

In conventional optical disks, because there cannot be adjacent vertical transitions, and in fact transitions need to be far enough apart for the reading beam to distinguish between them, encoding of the binary information is required whereby a greater number of physical locations are needed to store an equivalent number of bits. The insertion of error detection and correction requires further encoding which occupies storage locations. The additional levels of coding reduce both the amount of information that can be stored on the disk and the rate at which information can be retrieved. As a result, despite their less than one micrometer detail, optical disks typically require several micrometers to record one byte of data.

Efforts to increase the data retrieval rate have included multichannel reading (see U.S. Pat. No. 5,195,152). Multichannel reading increases data retrieval speed but not storage efficiency or capacity. If the underlying problem of inefficient disk storage were resolved, the speed increases resulting from multichannel reading would be significantly enhanced.

Efforts to increase the data storage capacity have included lower wavelength laser diodes, superresolution, multi-layered or holographic recording, double-sided disks and data compression. These methods all promise increased capacity, but not greater storage efficiency or retrieval speed.

Efforts to increase storage efficiency have included spectral hole burning (see U.S. Pat. No. 5,231,626). This method suffers from serious disadvantages because the storage of the information is not stable with the passage of time.

SUMMARY OF THE INVENTION

This invention addresses all three of the above identified issues—storage density, storage efficiency and retrieval speed—by giving the storage medium a stable multibit value at each position on the disk. By replacing the lands and pits of conventional disks with dots that absorb different wavelengths, this device allows the storage and retrieval of information by multiple bits rather than by a single bit. Specifically, the preferred embodiments of the apparatus use a plurality of light sources and a plurality of detectors for reading information stored as multiple-colored dots. Storage density increases depend on the number of colors used. For example, if 256 compositions with different absorption properties were used, each dot could represent 8 bits of data. Retrieval speed increases result from the fact that data is transmitted in multiple-bit bytes rather than one bit at a time. Further objects and advantages of the invention will become apparent from a consideration of the drawings and description.

DETAILED DESCRIPTION OF THE INVENTION

Essentially, the apparatus is comprised of one or more light sources producing sufficient intensity in the wavelengths of interest, a means for directing the light to a point at which corresponding colors have been recorded, one or more light sensors for detecting the result of the light's interaction with the recorded points, an analog-to-digital converter to convert the result into a digital code, and a translation of that code into a computer's corresponding binary code. The invention hereof uses the presence of compositions in localized regions on a substrate which absorb particular frequencies of electromagnetic radiation in a way that corresponds to retrievable information. The absorption properties of the composition at a particular location are selected to represent a particular value within a multibit code. Various ways of selecting the compositions to construct the code are described below.

The preferred embodiments involve the deposit of the compositions on a disk to form an improved optical disk that can borrow technology used in conventional optical disks appropriately adapted to take advantage of the color storage features. An optical disk to be used within this apparatus will have compositions deposited on its surface to store multiple bit information rather than using pits and lands. Specific compositions will be placed in localized regions on the disk to allow the information stored to be read in a fashion similar to a conventional optical disk. The distinguishable absorption features of all the possible compositions correspond to a code representing a selected set of possible information stored at a single location.

Figure 1:
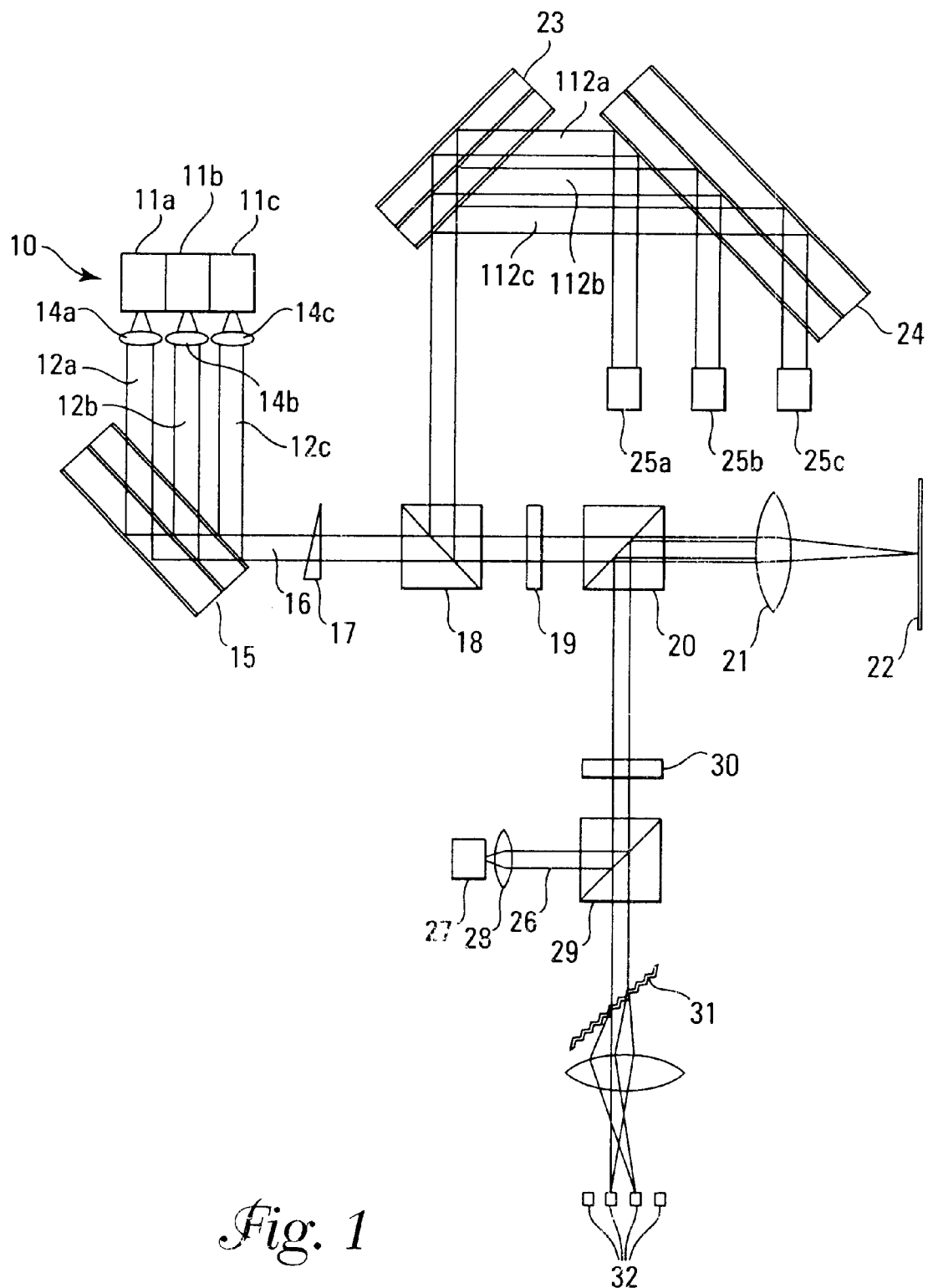
FIG. 1 is a schematic diagram of an embodiment of a multiple-wavelength laser diode reader.

Once the compositions representing the information are deposited on a substrate, a reader is used which can distinguish the absorption properties of the different compositions used to make up the multibit code. The light sources used span the wavelength regions used to store the information. Therefore, a single broadband source could be used, but this would require some means to separate the frequency spectrum before the measurement is made so the frequency dependent absorption can be measured. Similarly, a single detector could be used if the different frequencies of light were separate in time, although this would slow the reading process. Although different light sources, methods of directing and detecting the light, and methods of recording the information are possible, FIG. 1 presents a possible embodiment for the reader. The design of a specific apparatus involves the selection of the light source, optics and sensors to measure the wavelength dependent absorption of dots on a corresponding optical disk.

A. Reading Apparatus

FIG. 1 displays one embodiment of an optical reading apparatus within the present invention with an array 10 of three semiconductor diode lasers 11a, 11b, 11c, with each diode spaced a distance greater than about 50 micrometers ($\mu$m) from adjacent diodes. The array 10 emits three separate light beams 12a, 12b, 12c at wavelengths representing red, green, and blue. The red beam 12a, the green beam 12b, and the blue beam 12c pass through collimating lenses 14a, 14b, 14c, respectively, and enter a dichroic filter, or mirror 15. The filter 15 combines the three beams 12a, 12b, 12c into a single beam 16 consisting of laser light at the three different wavelengths. The variation in path length from passing through the filter 15 is irrelevant since the beam has not yet encountered the optical disk. Alternatively, the beam combination (and subsequent reseparation) could be performed by any serial array of wavelength-dependent reflectors (not shown). The combination of the beams is necessary to irradiate the same location on the disk with the different wavelength beams 12a–c.

Continuing with FIG. 1, the combined beam 16 then passes through a beam expanding prism 17, a polarizing beam splitter cube (PBSC) 18, a quarter wave plate 19, and a second PBSC 20. An objective lens 21 then focuses the combined beam on the surface on the disk 22. Alternatively, the beam could be directed to the disk via an optical fiber. In any event, beam 16 is reflected back through the objective lens 21, through the second PBSC 20, and the quarter wave plate 19. PBSC 18 is then applied. Because beam 16 has passed twice through a quarter wave plate, it is now rotated 180 degrees. As a result, beam 16 is deflected to dichroic filter 23, which separates beam 16 into beams 112a, 112b, and 112c. Dichroic filter 24 then reflects beams 112a–c to sensors 25a, 25b, and 25c The dichroic filter 24 is placed to adjust the path lengths of the three beams to be identical so the sensors 25a–c will be measuring the reflection of the three wavelengths at the same time. Alternatively, the beams could be resynchronized by eliminating filter 24 and placing sensors 25a–c at varying distances from filter 23.

Sensor 25a determines the intensity of the red light reflected from the disk surface. Sensor 25b determines the intensity of the green light reflected from the disk surface. Sensor 25c determines the intensity of the blue light reflected from the disk surface. An alternative to separating the beams for reading would be to have the combined beam travel directly to an array of sensors, each colored with an appropriate color filter to read one of the wavelengths present. Although charge coupled devices are envisioned, the type of device used for sensors 25a–c is irrelevant as long as the sensor is sensitive to light of the appropriate wavelength and has an appropriate sensitivity to detect the effect on the light beam of any absorption by the disk.

Although varying intensities of three colors are described above, alternative "codes" are possible depending on the light absorption characteristics of the chemicals used to record data. The particular use of a red, blue and green laser is designed for use with compositions with absorption maxima respectively in the red, blue and green visible absorption region with various codes possible using these compositions. What is important is that the sensors are collectively able to determine from the detected light the spectral properties of the composition stored at the physical location on the disk 22. Any method that directs multiple wavelengths of light to correspondingly colored dots and detects the resulting interaction would come within the scope of this invention.

In any event, the sensors send electrical output signals representing the recorded signal information to an analog-to-digital converter (not shown).

Assuming that three 8-bit sensors were used, the resulting 24-bit code is sent to a translation table for conversion to a computer's corresponding binary code. It should be noted that the above described device can also read current, binary disks. Two of the lasers and their corresponding sensors would be deactivated, and the signal to the remaining sensor would be decoded conventionally.

The tracking and focus mechanisms could be similar to those used for existing optical systems. Still referring to FIG. 1, emission 26 from an additional laser diode 27 is collimated by lens 28, sent through PBSC 29, a quarter wave plate 30, PBSC 20, and through objective lens 21 to disk 22. The returning beam, rotated 180 degrees by a second pass through quarter wave plate 30, passes through PBSC 29 to a grating 31 where it is split into signals used by tracking and focus sensors 32. The focus sensors 32 would be conventional, but the tracking sensors 32 would respond differently than sensors for a conventional disk reader. Specifically, in a conventional optical disk reader the need for a tracking adjustment is indicated by an increase in the amount of reflected light that results when the laser beam no longer passes over light-diffracting pits. In the multiple-colored dot reader, however, the need for a tracking correction is indicated by the decrease in reflected light that results as a the laser beam passes over the black background instead of colored dots. The tracking sensors would optionally respond conventionally in order to accommodate current, binary disks.

B. Information Storage

Figure 2:
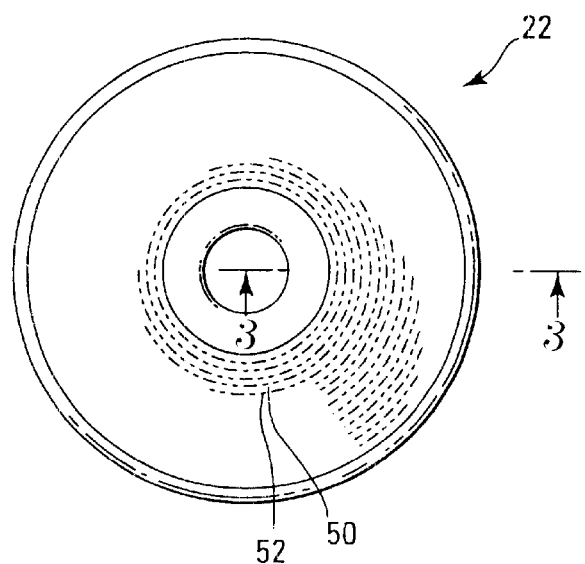
FIG. 2 is a top view of an optical disk on which information is stored using colored dots.
Figure 3:
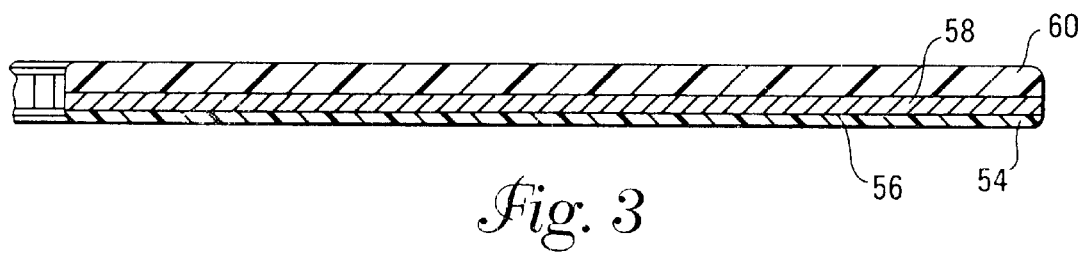
FIG. 3 is a sectional view of the optical disk of FIG. 2.

Essentially, the recorded information consists of a plurality of localized regions, referred to as dots although not necessarily round, each composed of chemicals having distinct light absorption spectra, or colors. Information can be recorded at a single point in a greater-than-binary code. Thus, information can be stored more compactly and retrieved more quickly. Various chemical compounds could be used to record information, the compounds could be placed in or on various media, and various sequential arrangements of the localized regions are possible. FIGS. 2 and 3 depict one embodiment. FIGS. 2 and 3 depict two views of an optical disk 22. Optical disk 22 can be the same size, shape, and physical dimensions of optical disks commonly used by audio CD and CD-ROM readers. Instead of circular or spiral tracks consisting of pits and spaces, disk 22 consists of circular or spiral tracks of multiple-colored dots 50 on a black background 52. Although a nonreflective (e.g. black) surface is suggested for its contrast value, other backgrounds are possible such as a highly reflective surface or a white surface.

Depicted in FIG. 3 are a plastic substrate 54, a reflective layer 56, photographic or other chemical emulsion 58, and a blank polycarbonate or other clear disk 60. Other arrangements are possible. For example, rather than the reflective system depicted, a look-through system could be used where there is no reflective layer and the light transmitted through the disk is measured. What is important is that any particular dot's characteristic spectral absorption be as clearly readable as possible.

In a preferred embodiment, the colored dots, which are preferably approximately 1 $\mu$m in diameter, might be photographically produced on a high resolution color slide film.

The developed film would be sandwiched between an otherwise blank polycarbonate disk and a protective backing. The combination would preferably have the same dimensions as a conventional disk. Although any number of chemical compounds could be used, one possibility is a high-resolution photographic emulsion using silver halide grains, less than 0.05 µm in diameter, in layers sensitive to each of the light wavelengths being used. In forming the disk, reflective material is interposed between the emulsion and the substrate to place the reflective surface as close to the emulsion as possible, thereby minimizing the reflective path through the film. An antihalation dye, such as those currently used in commercial film production, is preferably used to mask the reflective surface to minimize the production of a reflected image when the photograph is created. The antihalation dye would be clarified or washed away during development. Any dot gain, resulting from the laser beam being wider when it enters the emulsion than when it reaches its focal point on the reflective surface at the bottom of the emulsion, could be minimized if the emulsion were as thin as possible. Dot gain could also be reduced if the laser beam's angle of entry were reduced either by lowering the numerical aperture of the objective lens and increasing the distance between the lens and the disk surface, or by directing the beam to the disk via a pointed optical fiber instead of lenses.

In the embodiment using high resolution color slide film, the film for the disks could be written with a array of red, green, and blue lasers, each emitting preselected intensities of light particular for each dot created. Thus, a blue dot might be created with 100% blue, 0% red and green, a purple dot with 50% blue and red, 0% green, etc. The total number of colors used, from combinations of red, green and blue, balances risk of error against greater storage density. The greater the number of colors the greater the chance of error because the colors are less clearly distinguished. If the laser intensities are not varied, the three lasers can be used to store data corresponding to the three digit binary code corresponding to each laser either being on or off. If the laser intensities are varied to provide a greater number of colors or if more lasers are used, greater amounts of information can be stored in each dot, but some care is needed in selecting the colors to ensure that they are clearly distinguishable.

Existing technology can be adapted to the production of the required images on the film for producing the disk. Current drum imagesetter machines in the printing industry, for example, use a laser to write a 7.5 micrometer dot on photographic film, e.g., Avantra model sold by Agfa and Herkules models sold by Linotype-Hell. Replacement of the single red laser diode with an array of red, green and blue laser diodes with the light, appropriately focused to expose the same dots, would allow the writing of dots using appropriate combinations of the colors. Modifications could allow the use of smaller or larger dot sizes as desired. The current machines that use large sheets of film on rollers could be modified to present a spinning disk of photographic film, with the laser mounted on a lead screw, so, in combination, a spiral of color dots or other desired pattern would be produced. The film would preferably be dimensionally identical with current CD-ROM disks, so existing CD-ROM disks can be played in the same reader.

Alternatively, the present systems used in CD-ROM manufacture can be adapted to the production of disks of the present invention. Current CD-ROM manufacture involves using a laser to cut submicrometer pits in photoresist. The single laser can be replaced with three color lasers and the photoresist replaced with photographic film of sufficiently small grain. High resolution plate, introduced by Kodak in 1940, has grain sizes of less than 0.05 micrometers.

A laser-written original could be photographically reproduced in the same manner as microfilm is processed. In this case, a fine grain emulsion would be used to produce a very high quality master. The high quality master is photographically reproduced to make copies for distribution. The size and configuration of the tracks of colored dots could be substantially identical to current optical disks to assist in backwards compatibility between the reader described earlier and optical disks now in use.

Color slide film uses broadly absorbing compounds to ensure that the entire visible absorption spectrum is reproduced to approximate how human vision will record the color. Therefore, the absorption properties of the developed film may not exactly mimic the particular laser light used to produce the dots. As a simple example, if only red light is used to produce a dot, some green and blue light may be absorbed by the developed film. This is not a problem as long as it is taken into account. To minimize error, each disk 22 should preferably have one or more sets of standard dots at the start of the disk 22, so the reader can check its absorption calibration for each color in the code. This can also help correct for any variation between lots of film and for any variation in the color with the passage of time. Further, any color degradation over time can be minimized by providing a protective sleeve for the disk, and using materials, including film type, that tend to resist color loss.

Referring again to FIG. 2, the black space 52 between the dots 50 and the limited number of available colors being used permit a high signal to noise ratio. The elimination of current stamping techniques may also reduce the need for error correction. Production techniques for conventional optical disks require the sophisticated error correction algorithms. A properly designed photographic based system has the potential of reducing the need for elaborate error correction methods.

As will be appreciated, this invention differs substantially from alternative optical data storage and retrieval methods. By using multiple wavelengths, a level of storage efficiency is achieved that exceeds all binary systems. At the same time, the storage is stable over long periods of time to give an essentially permanent record of the information.

While color slide film provides a particularly convenient and readily available medium for producing disks 22 within the present invention, other options can be used to provide the medium with dots with selected spectral properties. Color film uses three pigments with broad absorption and particular maxima to cover the entire visible spectrum while mimicking the color receptors in the human eye. For the storage of data on a disk, there is no need to cover the visible spectrum. So, it may be possible to obtain lower error rates using pigments with relatively narrow non-overlapping absorption bands. Also, the locations of the absorption maxima can be shifted. Shifting the absorptions to the lower energy infrared may help reduce the degradation of the colors as a result of repeated exposure to the laser light. This would also allow the use of currently available infrared diode lasers for reading and writing.

Furthermore, there is no need to limit the number of colors to three. Numerous chemicals with narrow, relatively non-overlapping thermal ground state absorption bands could be used. These can be used in various combinations to produce the dots in the same way as the codes were used with the color film. Generally, there will be one electromagnetic frequency used for each composition corresponding to an absorption maximum of the composition.

Given a fixed number of compositions, the information code can be selected based on error tolerances desired and the convenience of the production techniques. The most information can be stored using the selected set of compositions by using a variety of mixtures of the compositions. This requires the capability of distinguishing quantities of the compounds as well as their presence or absence. Such a procedure was described above with the color slide film embodiment. The use of significantly overlapping absorbance bands of the compositions leads to a situation where multiple frequencies are always significantly absorbed.

With more narrowly absorbing compounds, one could deposit or not deposit any or all of the compounds in a particular dot. Then, the system need only detect the presence or absence of a particular compound not its quantity in the dot. This should lead to reduced errors. Assuming, for example, eight distinct chemicals, eight light sources with appropriate frequencies and eight sensors, the system could pick up an eight-bit code from the presence or absence of each wavelength in a dot. Perhaps the errors can be reduced the most by incorporating only one narrowly absorbing compound per dot at the expense of less storage per dot for a given number of lasers. For, example, three compounds could be used to store two bits of information: 00 represented by no compound, 01 compound 1, 10 compound 2 and 11 compound 3.

Film processing techniques provide a particularly convenient, and well developed method to deposit the coating assuming that compounds with the desired absorption properties are available with this technique. Other techniques can be used to deposit the compounds onto the substrate, for example, photolithography as used for depositing compounds in the production of integrated circuits. Once a set of compositions is selected, the light sources, detectors and optics can be suitably designed.

Other potential benefits of the color dot, or extra-binary storage, at the heart of this invention include its effect on the search for re-writable cd-roms. Photochromic media already exist and could be adapted, with writing and erasing functions performed by the same or separate laser arrays. The use of multiple polychromic media to make use of the advantages of the present invention can produce multibit storage in a rewritable format.

While the invention has been described with particular reference to the preferred embodiments, it will be understood by those skilled in the art that various changes may be made and equivalents may be substituted for elements of the preferred embodiment without departing from the essential teachings of the present invention. It is intended that any optical reading device, modified to read multiple-colored dots of any size on a disk of any size, would be covered by this patent. Further, any reference to silver halide photochemistry, or to use of a polycarbonate material, is intended to be illustrative only. Finally, any compatible retrieval speed or data density techniques, such as multiple-channel reading, two-sided disks or data compression, may be used without departing from the spirit of this invention. It is accordingly intended that the claims shall cover all such modifications and applications as do not depart from the true spirit and scope of the invention.

What is claimed is:

1. An optical disk for encoding information at high densities and permitting fast retrieval speed, said optical disk comprising:

a support having a generally planar surface; and
   a plurality of localized regions at unique sites along said generally planar surface of said support, where each of said localized regions is separated from other localized regions by a uniform background, each of said localized regions comprising a chemical composition specific for said localized region that is part of a nonuniform distribution of chemical compositions along said generally planar surface, with said specific chemical composition storing multiple bit information associated with said localized region based on the ground state absorption spectrum of said chemical composition.

2. An optical disk of claim 1 wherein said chemical composition comprises a specific mixture of compounds selected from a group of at least two compounds with different absorption maxima.

3. An optical disk of claim 2 wherein each of said at least two compounds absorb in a relatively narrow region of the electromagnetic spectrum.

4. An optical disk of claim 3 wherein said relatively narrow region of the electromagnetic region of the electromagnetic spectrum is in the visible portion of said spectrum.

5. An optical disk of claim 3 wherein said relatively narrow region of the electromagnetic region of the electromagnetic spectrum is in the infrared portion of said spectrum.

6. An optical disk of claim 1 wherein said chemical composition is selected to have absorption within a specified range and relatively low absorption within other specified regions of the electromagnetic spectrum.

7. An optical disk of claim 1 wherein said chemical composition has a local maximum of absorption in a specific region of the electromagnetic spectrum.

* * * * *